(12) United States Patent
Wolleschensky

(10) Patent No.: US 7,301,696 B2
(45) Date of Patent: Nov. 27, 2007

(54) OPTICAL SCANNING MICROSCOPE

(75) Inventor: Ralf Wolleschensky, Apolda (DE)

(73) Assignee: Carl Zeiss Jena GmbH, Jena (DE)

( * ) Notice: Subject to any disclaimer, the term of this patent is extended or adjusted under 35 U.S.C. 154(b) by 198 days.

(21) Appl. No.: 10/967,321

(22) Filed: Oct. 19, 2004

(65) Prior Publication Data

US 2006/0012865 A1    Jan. 19, 2006

(30) Foreign Application Priority Data

Jul. 16, 2004    (DE) .................... 10 2004 034 983

(51) Int. Cl.
  *G02B 21/06*    (2006.01)
(52) U.S. Cl. ...................... 359/385; 359/215
(58) Field of Classification Search ................ 359/368, 359/385, 389, 201, 202
See application file for complete search history.

(56) References Cited

U.S. PATENT DOCUMENTS 6,088,097 A * 7/2000 Uhl ............................ 356/318
6,094,300 A    7/2000 Kashima et al.
6,134,002 A * 10/2000 Stimson et al. ............. 356/326
6,185,036 B1 * 2/2001 Tanaami ...................... 359/368
6,947,127 B2    9/2005 Wolleschensky et al.
2002/0020800 A1 * 2/2002 Knebel et al. ........... 250/201.3

FOREIGN PATENT DOCUMENTS

WO      WO 95/30167    * 11/1995

* cited by examiner

*Primary Examiner*—Alessandro Amari
*Assistant Examiner*—Mark Consilvio
(74) *Attorney, Agent, or Firm*—Jacobson Holman PLLC

(57) ABSTRACT

Microscope, in particular optical scanning microscope with illumination of a specimen via a beam splitter, which is arranged in an objective pupil and consists of at least a reflecting first portion and at least a transmitting second portion, whereby the reflecting portion serves to couple in the illumination light and the transmitting portion serves to pass the detection light in the detection direction or the transmitting portion serves to couple in the illumination light and the reflecting portion serves to couple out the detection light, with a first scanning arrangement, whereby means are provided in the detection light path for the overlay of at least one further scanning arrangement for illumination and detection.

1 Claim, 5 Drawing Sheets

OPTICAL SCANNING MICROSCOPE

BACKGROUND OF THE INVENTION

1. Field of the Invention

The present invention is directed to a microscope, in particular an optical scanning microscope with illumination of a specimen via a beam splitter

2. Related Art

In U.S. Pat. No. 6,888,148 among other things a beam splitter is described for a line scanner.

In a line scanner the specimen is illuminated with a line focus (e.g. along the X-coordinate), which is shifted in the coordinate (Y) perpendicular to the line. For this the source of light is linearly focused into an intermediate image plane of the microscope mechanism by means of optics. By the focusing in Y direction in the intermediate image, for example by a cylinder lens, a linear and diffraction-limited distribution of intensity arises along X on the specimen. With further optics the light is focused into the pupil of the microscope arrangement. In the pupil levels of the microscope arrangement a line focus results in each case. The pupil levels and the scanner are conjugate to each other and to the rear focal plane of the microscope arrangement, so that the scanner can induce the linear and diffraction-limited focused distribution of intensity perpendicular to this (Y-coordinate in the specimen). The focusing into the specimen is made by scan optics, the tube lens and the objective. Relay optics produces conjugate pupil levels of the microscope arrangement. Due to the kind of the specimen reciprocal effect e.g. during an excitation for fluorescence or luminescence the light emitted from the specimen is of small spatial coherency. That is each point excited in the specimen radiates essentially independently of the neighboring points as point emitter into all directions in space. The optics, (e.g. a microscope objective) displays the individual point emitters together with the tube lens TL into an intermediate image plane ZB of the microscope mechanism, whereby the pupil P is illuminated homogeneously (broken light path) by wave fronts that are essentially incoherent to each other and of different directions of propagation. In the pupil is the element which separates the excitation light from the detection light. It is constructed as described in DE.

SUMMARY OF THE INVENTION

The present invention is directed to a microscope, in particular an optical scanning microscope with illumination of a specimen via a beam splitter, which is arranged in an objective pupil and consists of at least a reflecting first portion and at least a transmitting second portion, whereby the reflecting portion serves to couple in the illumination light and the transmitting portion serves to pass the detection light in the detection direction or the transmitting portion serves to couple in the illumination light and the reflecting portion serves to couple out the detection light, with a first scanning arrangement, whereby means are provided in the detection light path for the overlay of at least one further scanning arrangement for illumination and detection.

DETAILED DESCRIPTION OF THE PREFERRED EMBODIMENTS

FIG. 1:

The light of a far field-source of light LQ is focused with suitable optics for the production of an illumination line, for example a cylinder lens ZL, linearly into one level that is conjugate to the pupil P of the microscope objective O, in which there is a developed beam splitter ST in accordance with U.S. Pat. No. 6,888,148, which exhibits a narrow linear transmitter range, over which the line is displayed via transmission optics L1, L2, scan optics SO, tube lens TL and objective O into the specimen PR. A scanner SC is arranged in a pupil P, that moves the line quickly over the specimen in a scan direction perpendicular to the line expansion.

The light (broken) coming from the specimen, is returned by the beam splitter reflecting up to the narrow transmitter range in direction of detection via a replaceable filter F as well as detection optics PO toward a detector DE1, in front of which a slit diaphragm can be arranged.

Figure 1:
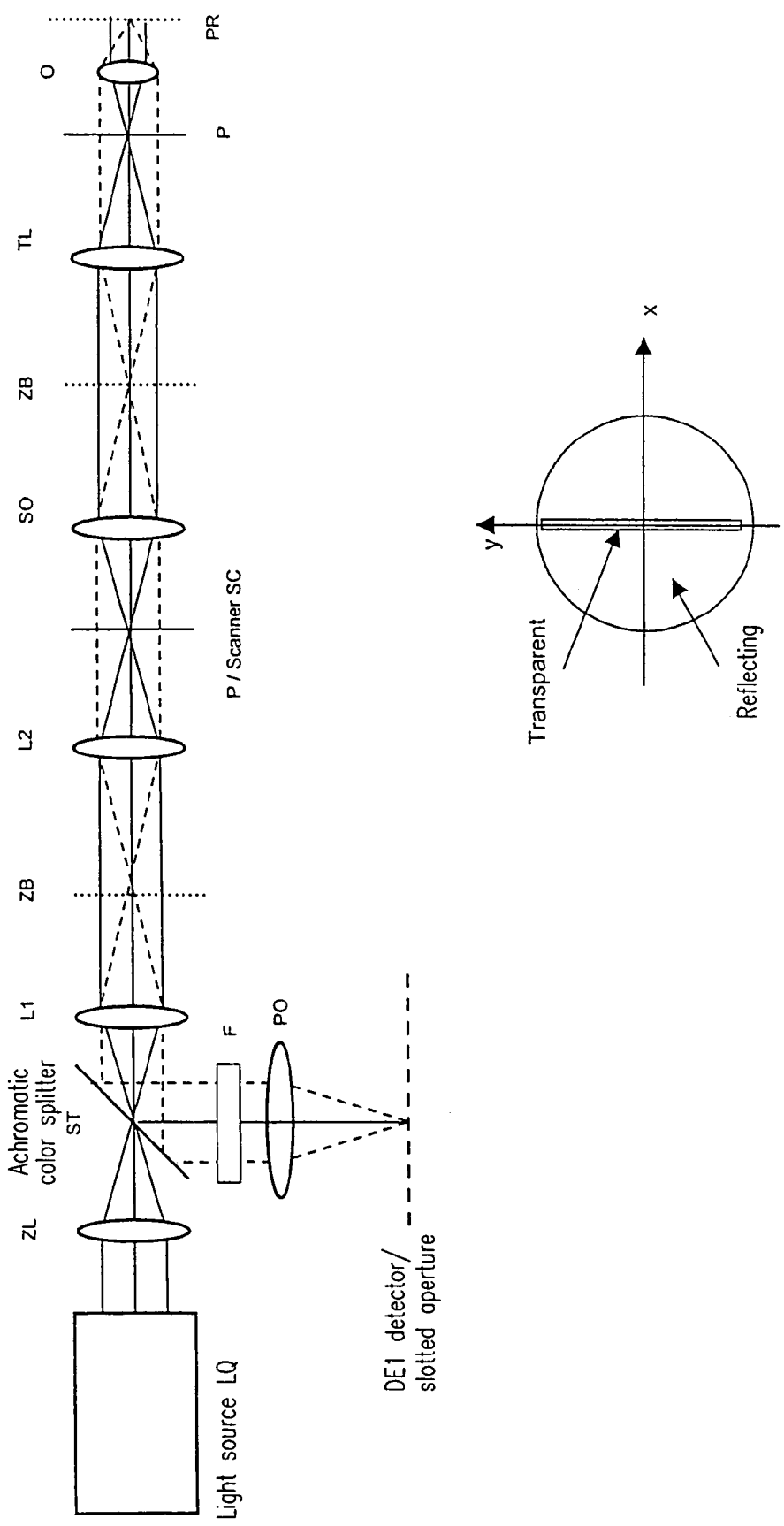
FIG. 1 is a schematic view of a first embodiment of an optical scanning microscope in accordance with the present invention.

FIG. 2:

Here exemplary sources of light LQ1, LQ2 are represented in addition to the elements represented in FIG. 1 on cross ports, which can result also from bypass of only one source of light, whereby wavelength and intensity can be adjusted advantageously.

By use of achromatic beam splitters as described in DE . . . the special advantage is that the same wavelength can be used for both sources of light LQ1, LQ2, which can be formed also by allocation in and of the same source of light. The intermediate images ZB and ZB1 are levels conjugate to each other. Furthermore, the pupil levels of the microscope arrangement P are conjugate levels to each other. The conjugate levels in each case are produced by the effect of the optics lying between them in each case (those acting as relay optics-light paths only schematically drawn).

LQ 2 can be for example a point scanner. The illumination light of the point scanner can be used advantageously for the purposeful manipulation (e.g. uncaging) on certain specimen ranges.

The illumination light of LQ2 is faded after passage by separate scan optics SO2 as well as a scanner SC1 (a X/Y scanner favorable) over a usual dichroic color divider FT1 into the detection light path of the line scanner and arrives over the reflective range of the divider ST toward the specimen PR.

The reflecting range of the beam splitter ST is thus used advantageously for the reflection of a further scan light path.

The light coming from the specimen arrives on the one hand at the detector DE1 and on the other hand depending on interpretation of the color divider FT1 also via a further color divider FT2 toward a second detector DE2.

For example fluorescence light excited by LQ1 coming from the specimen arrives during appropriate interpretation by FT1 on the detector DE1 while reflected light of the point scanner LQ2 arrives on the detector DE2. Furthermore different fluorescence wavelengths excited also by LQ1 and LQ2 can arrive on the different detectors DE1 and DE2.

Since the light moved by the scanner SC1 is moved here additionally by the scannerSC, the scanner SC1 must be controlled in such a way that it compensates for the movement of the scanner SC and additionally realizes a relative position for line illumination.

That is simple to realize if scanner SC1 moves slower in comparison to the scannerSC.

The fluorescence light induced by LQ2 can be also guided on the line detector DE1.

Depending on the position of the scanner 2 the fluorescent spot moves away over the line detector DE 1, i.e. the light is separated by the scanner 2 toward DE1.

FIG. 3

Here a cross port KS1 is provided, that can be a separate module and is between a microscope stand S with tube lens and objective, a first scan unit SC1 and a second scan unit SC 2.

SC 1 can contain the described line scanner and SC2 a point scanner for scanning and/or manipulation.

SC1 and SC 2 are couplable with KS1 at interfaces.

For this several intermediate images ZB that are conjugate to each other are available in KS1 (via the optics L1, L2). The conjugate levels in each case are produced by the effect of the optics lying between them (light paths only schematic).

At the beam splitter ST1, which is developed analogous to the beam splitter ST (DE . . . ) a line is focused on the specimen by the transmitting range. It is attached in one pupil level of the microscope arrangement.

For example with SC1 excited light such as fluorescence light in the specimen is reflected downward at ST1 and arrives over FT3, which is here constructed such that it lets this light portion pass through, as well as over several reflectors RF onto the other side of ST1. This light is diverted by ST1 toward the detector DE1 via ST.

The fluorescence light excited by the line scanner, which is reflected at ST1 to the side, is thus brought advantageously in the entire width back into the light path toward DE1.

Thus a further scanner SC2 can be reflected via FT3, whereby by appropriate training of FT3, which can be replaceable, different fluorescence wavelengths can arrive at DE1 and/or DE2. The mode of operation is similar to the one described above.

Figure 2:
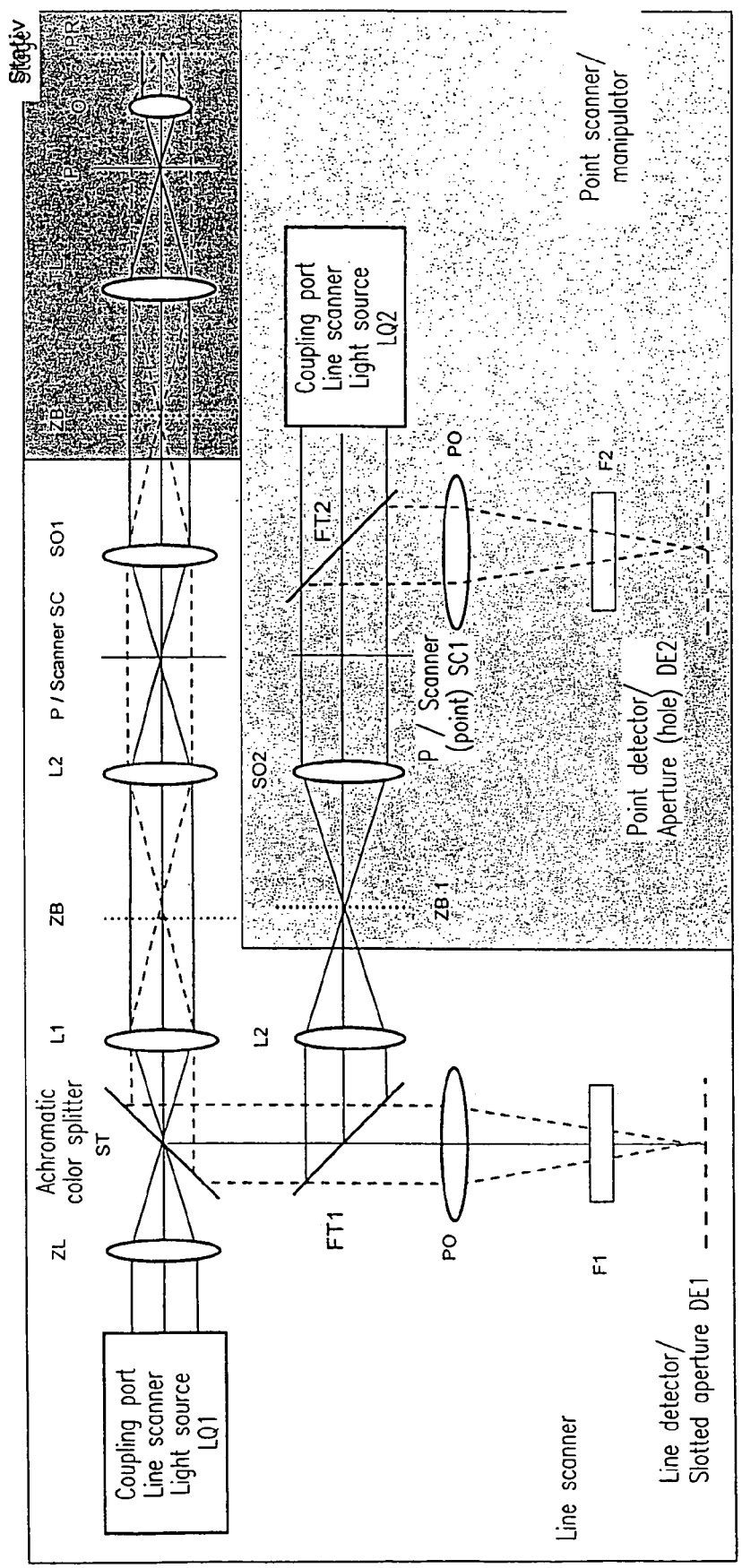
FIG. 2 is a schematic view of a second embodiment of an optical scanning microscope in accordance with the present invention.

Contrary to FIG. 2 the scanners SC1 and SC2 can work here advantageously independent of each other.

Figure 3:
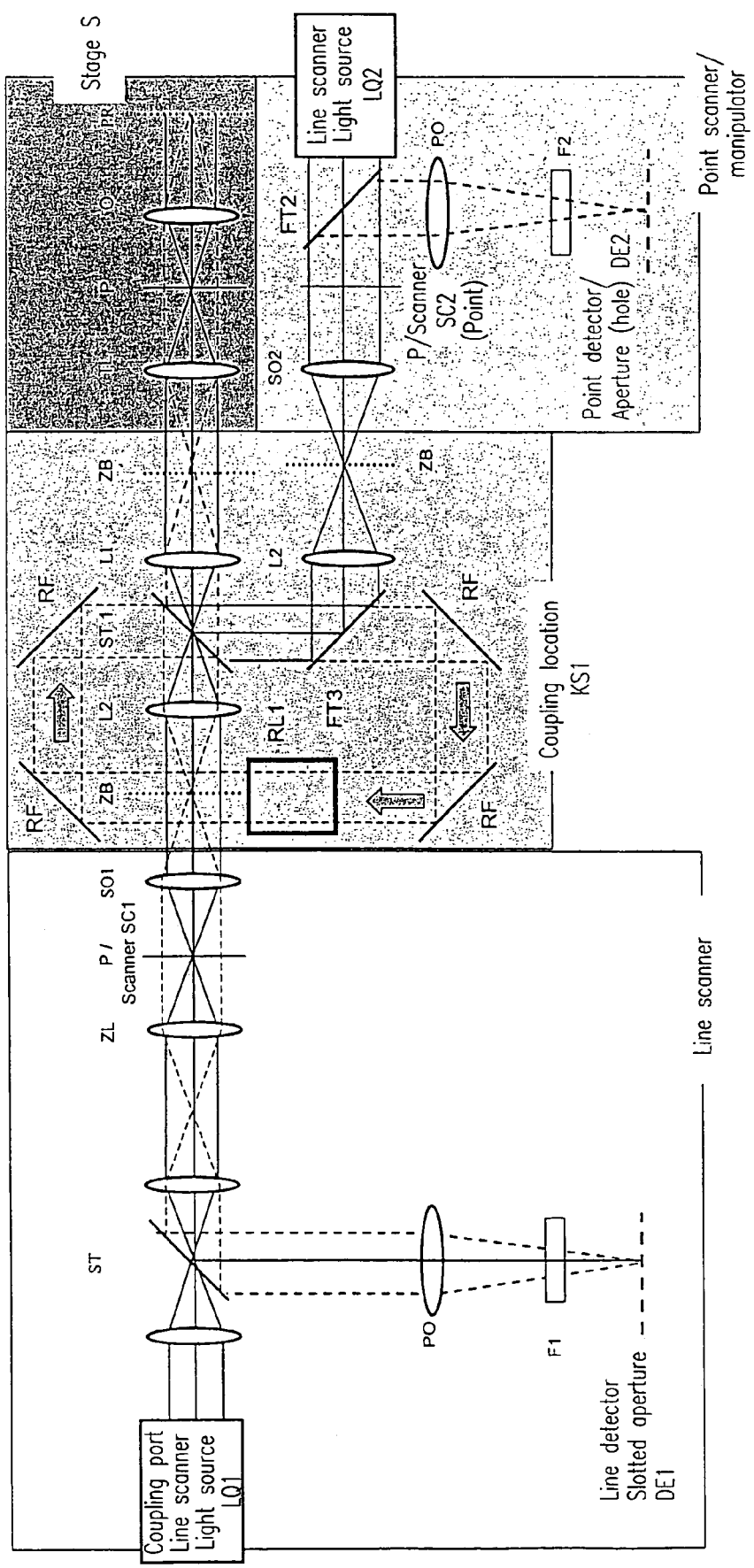
FIG. 3 is a schematic view of a third embodiment of an optical scanning microscope in accordance with the present invention.

FIG. 4:

Here the light is not guided via reflectors RF on the back side of the beam splitter ST1 as in FIG. 3 but on the back side of the scannerSC3, which is here a mirror that can reflect on its front and back sides and further guides with its back side the specimen light (descanned) coming from the specimen and excited by the line scanner (LQ1 arrives from above on the front side of the scanner mirror) to the detector DE1 FT3 is constructed here in such a way that it lets through the light intended for the detector DE1 and only reflects the light intended for DE2.

Thereby again different fluorescences excited by the line scanner and the point scanner can be detected advantageously at the same time.

Figure 4:
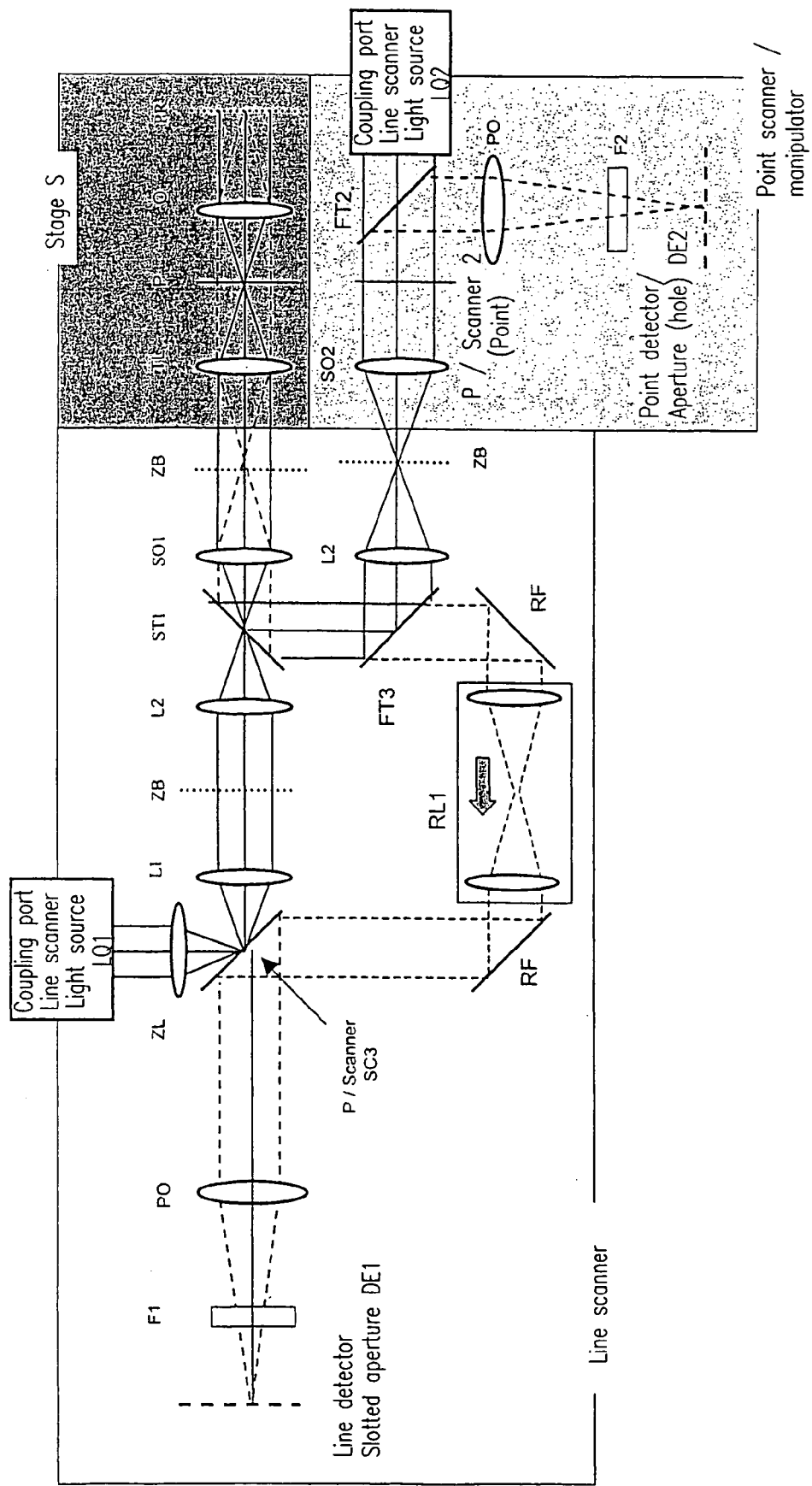
FIG. 4 is a schematic view of a fourth embodiment of an optical scanning microscope in accordance with the present invention.
Figure 5:
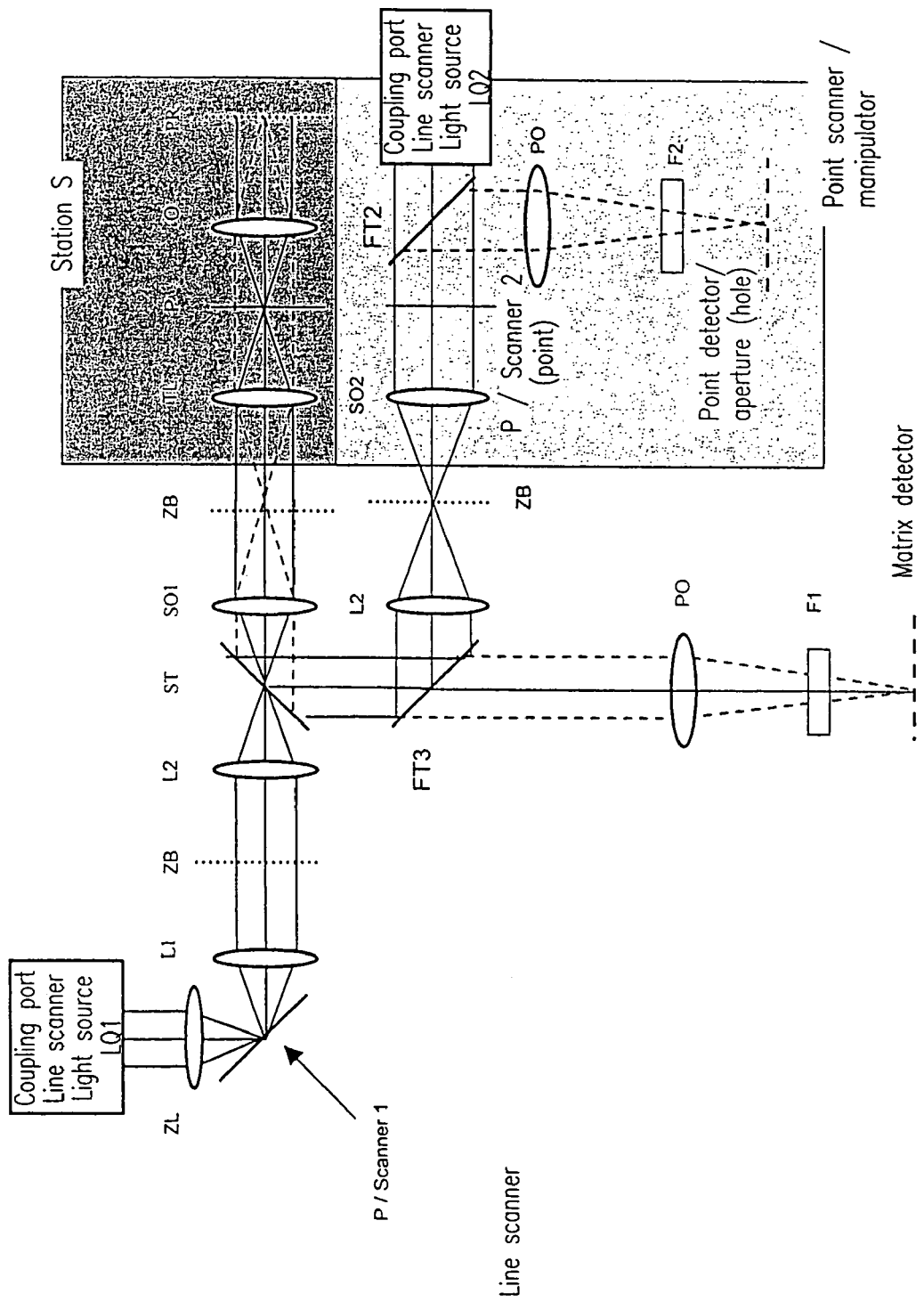
FIG. 5 is a schematic view of a fifth embodiment of an optical scanning microscope in accordance with the present invention.

FIG. 5:

Here the light excited by the line scanner is not descanned as in FIG. 4 but arrives via FT1 directly at a surface detector (CCD matrix, gegatete camera), i.e. the linear light distribution coming from the specimen runs in the direction of the scan via the receiver surfaces, which records thereby a specimen image.

Further scan arrangements can also be reflected by cascading (arrangement of further color dividers FT into a common light path). The scan arrangements can be arbitrary image-giving arrangements. Examples are the already mentioned point scanners, scanners of point of resonance, Nipkow scanner, line scanners and multi-point scanners. Furthermore, these can also be far-field based microscope systems. It is advantageous here that they exhibit an intermediate image plane as interface.

The invention claimed is:

1. An optical scanning microscope comprising:
   a source of illumination light,
   an objective pupil,
   a beam splitter for illuminating a specimen with the illumination light, the beam splitter being arranged in the objective pupil and including at least one reflecting first portion and at least one transmitting second portion, wherein one of the first and second portion couples in the illumination light and the other of the first and second portion passes detection light in a detection direction,
   a first scanning arrangement for scanning the illumination light onto the beam splitter,
   at least one further scanning arrangement coupled in via the beam splitter, and
   means for detecting specimen light coming from the beam splitter without descanning.

* * * * *